United States Patent Office.

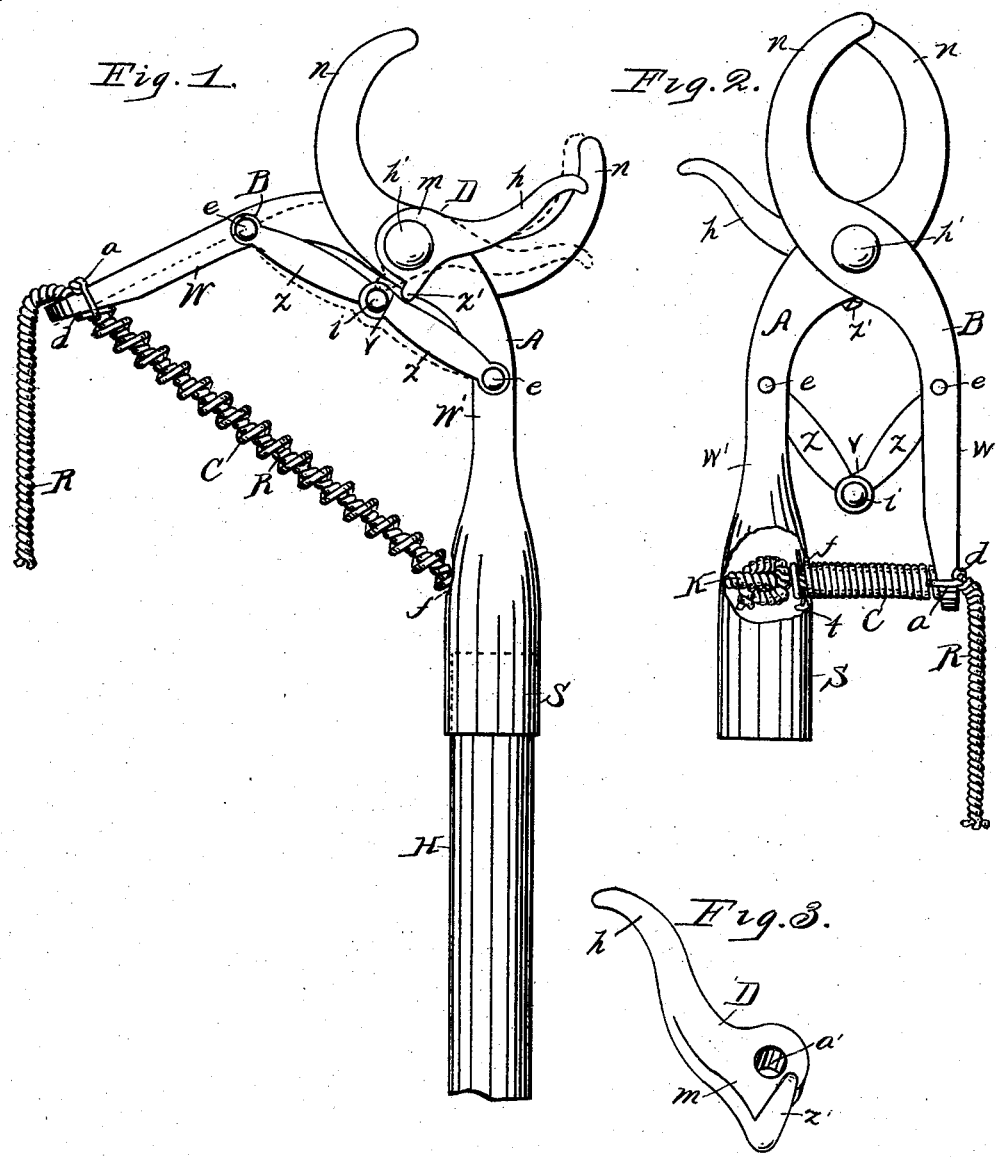

ROLLIN D. CHAPPELL, OF VASSAR, ASSIGNOR OF ONE-HALF TO GEORGE REID, OF REESE, MICHIGAN.

ANIMAL-CATCHER.

SPECIFICATION forming part of Letters Patent No. 369,230, dated August 30, 1887.

Application filed May 16, 1887. Serial No. 238,443. (No model.)

*To all whom it may concern:*

Be it known that I, ROLLIN D. CHAPPELL, a citizen of the United States, residing at Vassar, in the county of Tuscola and State of Michigan, have invented certain new and useful Improvements in Animal-Catchers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to devices for catching cattle, sheep, and swine by the legs, or the same may also be caught and handled by the nose; and my invention therein relates to the means employed for setting the jaws and tripping them, and also in the manner of attaching the spring and rope to said jaws, as hereinafter specified, and pointed out particularly in the claims.

In the accompanying drawings, forming a part of the specification, Figure 1 is a plan of the back or under face of the device embodying my invention, the parts being opened for operation. Fig. 2 is a plan of the front face of the same, showing the position of the parts as clamped or closed. Fig. 3 is a detail in perspective.

As indicated in the drawings, H represents the pole or staff, which may be of any suitable length.

A B are the clamping-jaws, the front ends of which have the curved prongs $n$ $n$. The arm W' of one jaw has the socket or shank S, which receives freely one end of the staff H, as shown in Fig. 1. The arm W of the opposite jaw has at its free end a hole, $d$, through which passes freely the cord or rope R, which may be of any suitable length. Said cord passes also through the hole $f$ into the shank S, at which point I form a knot, K. (See Fig. 2.)

C is a coiled spring having one end attached to the rear end of the jaw B by means of the wire yokes $a$ $a$, which pass over a coil of said spring and the end of the arm, as shown in Figs. 1 and 2. The other end of the spring passes into the hole $f$ of the shank of the opposite jaw, and $t$ is a metal pin which passes between the coils of the spring and through the rope R. Said rope passes through the coils of said spring, the pin $t$ being located in the shank crossing the hole $f$, whereby said spring is firmly secured to said shank.

Z Z are levers pivoted together at one end by means of the rivet or screw $i$. The opposite ends of the levers are pivoted to the arms W W' of the jaws by means of the rivets $e$ $e$, and in such a position as will allow the jaws to be thrown apart, as shown in Fig. 1, the levers Z Z standing on a line, so as to cause the joined ends at the center to pass slightly forward, causing the inclined edge V of one of the levers to strike the tripping-prong Z' of the dog D. Said dog has a curved arm, $h$, and a hole, $a'$, through the head $m$. (See Fig. 3.) The rivet or bolt $h'$ passes through the hole of the dog and through a like hole in both of the jaws A B, whereby said parts are pivotally connected together, as shown in Figs. 1 and 2.

The operations are as follows: To set the device the jaws A B are thrown apart at the rear ends by grasping them and pulling from each other and throwing the joined or pivoted ends of the levers Z Z against the prong Z' of the dog, swinging the arm $h$ of said dog forward, as shown in Fig. 1. The tendency of the coiled spring C is to close up, and when expanded, as shown in Fig. 1, its tension on the jaws causes the parts to remain open, as shown in said view. The operator then grasps the staff H in both hands, or by one hand, and the rope R by the other, and advances toward the animal to such a position that the staff H will permit the placing of the opened arms $n$ $n$ astride the leg of the animal. As the arm $h$ of the dog strikes the leg, said arm is thrown back to the dotted position of Fig. 1, causing the prong Z' to throw the joined ends of the levers Z Z outward, as shown by dotted lines in Fig. 1, when the coiled spring C will close the jaw B, as shown in Fig. 2, grasping the leg of the animal. The staff H may then be withdrawn from the socket S and the animal handled by the rope R.

It will be observed that a strain on the rope will cause the jaws to close, and therefore the greater the resistance of the animal the more firmly the jaws will be closed, and said jaws are released from the leg of the animal by throwing the rear ends apart.

Having thus fully set forth my invention, what I claim as new, and desire to secure by Letters Patent, is—

1. The combination of the jaws, the tripping-dog, the bolt passing through said parts, the levers pivoted together and to said jaws, the spring attached to the rear ends of the jaws, the rope passing through one of the jaws, and the spring having one end attached to the opposite jaw and the staff detachably connected to one of said jaws, as and for the purposes specified.

2. In a device for the purposes specified, the combination of the jaws A B, the dog having the curved arm $h$ and prong $Z'$, the bolt or rivet $h'$, the levers Z Z, pivoted as set forth, the coiled spring having one end secured to the jaw B by means of the yokes $a$, the rope R, passing through said jaw at the rear end and through the hole $f$ of the jaw A, the pin $t$, passing between the coils of said spring, and the rope within the socket of the jaw A, and staff H, adapted to enter said socket, substantially as and for the purposes specified.

In testimony whereof I affix my signature in presence of two witnesses.

ROLLIN D. CHAPPELL.

Witnesses:
FRANK L. FALES,
H. W. V. LEACH.